Feb. 25, 1930.　　　　F. NAGLER　　　　1,748,893
HYDRAULIC TURBINE
Original Filed Oct. 20, 1917
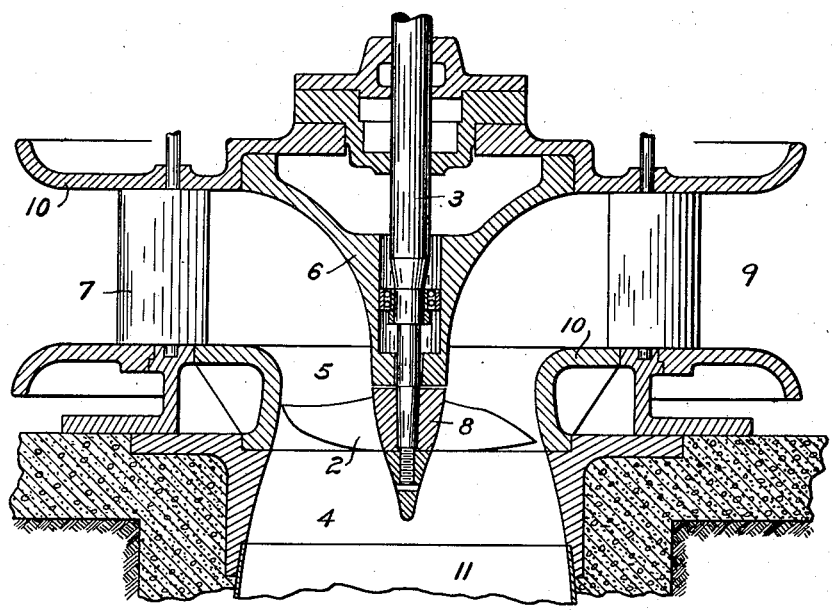
INVENTOR-
F. Nagler
BY
ATTORNEY.

Patented Feb. 25, 1930

1,748,893

UNITED STATES PATENT OFFICE

FORREST NAGLER, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

HYDRAULIC TURBINE

Original application filed October 20, 1917, Serial No. 197,964. Divided and this application filed September 26, 1919. Serial No. 327,349. Renewed November 11, 1924.

This invention relates to improvements in apparatus for converting hydraulic potential energy into kinetic energy.

An object of the invention is to provide simple and efficient apparatus for converting hydraulic potential energy into kinetic energy. A more specific object is to provide apparatus for effectively converting hydraulic potential energy into relatively high speed rotary motion, in order to permit utilization of more compact, simple and efficient energy translating machinery than has heretofore been possible. Another specific object is to provide a hydraulic turbine which will operate at substantially uniform high efficiency regardless of variations in the available hydraulic head or of the selected speed of rotation of the unit.

The invention consists in producing in a conduit a flowing stream of liquid and locating in this stream a specially constructed impeller. The velocity of the liquid is preferably augmented in the locality of the impeller by constricting the adjacent portion of the conduit. The impeller which is preferably of the axial flow type, is provided with one or more vanes fixed to and radiating from a central hub. The fluid is admitted to this axial flow impeller past an annular series of radial inward flow guide vanes and through a transition space wherein the direction of flow is changed from radial to axial.

This application is a division of application Serial No. 197,964, filed October 20, 1917 for patent for improvements in hydraulic processes and apparatus.

A clear conception of one embodiment of the invention may be had by referring to the drawing accompanying and forming a part of this specification in which like reference characters designate the same or similar parts in the various views.

The single figure of the drawing discloses a central vertical section of a hydraulic turbine installation embodying inward flow guide vanes and an axial flow runner.

The hydraulic turbine installation disclosed in the drawing comprises a stationary turbine casing 10 forming a conduit 4 connecting the penstock 9 with the draft tube 11. The conduit 4 is provided with a vertical local constriction 5 adjacent which is located a turbine impeller 2. The impeller 2 is of the axial flow type and comprises a series of vanes radiating from a central hub 8 of small diameter secured to the vertical shaft 3. The impeller 2 has propeller shaped vanes which are formed to convert the energy of the whirling stream of water into high speed rotary motion, the formation of the impeller being such that a relatively high specific speed is attainable as compared to that attainable with the rotors of prior turbines. The casing 10 is provided with an inverted substantially frusto-conical stationary guide 6 which changes the direction of flow of the liquid from radial to axial and forms a support for a ball bearing coacting with the shaft 3 adjacent the impeller 2. The stationary guide 6 extends in close proximity to the impeller 2 and besides providing a bearing for the shaft 3 located as near to the impeller as possible, prevents the rapidly moving stream of liquid from flowing in contact with the rotating shaft 3. Governor controlled movable inward flow guide vanes 7 of usual construction are mounted in the casing 10 and control the flow of liquid to the conduit 4.

During the normal operation of the turbine the guide vanes 7 are operated either manually or by means of a speed governor, in the usual manner, to produce and to control the flow of liquid from the penstock 9 into the conduit 4. As the stream of liquid enters the constriction 5 of the conduit 4, the velocity thereof is augmented to produce a relatively rapidly flowing jet adjacent the impeller 2. When the liquid strikes the impeller vanes, this impeller is caused to rotate, thereby imparting rotation to the shaft 3.

The provision of stationary guiding means extending in proximity to the impeller 2, serves to reduce to a minimum the friction losses. By providing inward flow movable guide vanes 7 of standard construction, the cost of construction is materially reduced and the structure simplified.

It should be understood that it is not desired to limit the invention to the exact details of construction herein shown and described, for obvious modifications may occur to a person skilled in the art.

It is claimed and desired to secure by Letters Patent:

1. In a hydraulic turbine, a conduit enclosed by a casing and comprising a radial flow inlet portion having guide vanes therein, and an axial flow portion, a vane-free transition space extending from said radial flow portion to a point in said axial flow portion beyond the inlet thereof and in which the flow changes from radial to axial and axially advances, and an axial flow runner axially beyond said point in said axial flow portion.

2. In a hydraulic turbine, a conduit enclosed by a casing and comprising a radial flow inlet portion having inward flow guide vanes therein, an axial flow portion and a portion connecting said radial flow and said axial flow portions, and an axial flow runner in said axial flow portion and spaced from the inlet thereof, said connecting portion and the part of said axial flow portion at the inlet side of said runner being vane-free.

3. In a hydraulic turbine, a conduit enclosed by a casing and comprising a radial flow inlet portion having inward flow guide vanes therein, an axial flow portion, a portion connecting said radial flow and axial flow portions and in which the flow changes from radial to axial, and an axial flow runner in said axial flow portion adapted to receive fluid advancing along said axial flow portion and spaced from the inlet thereof, said connecting portion and the part of said axial flow portion at the inlet side thereof being vane-free.

4. The method of utilizing the energy of water under head which consists in directing its flow inwardly from all sides with radial and whirling components with respect to a common axis, changing the radial components to axial direction but preserving the whirling component so as to produce a solid stream whirling about and advancing along the axis, and directing this stream axially against a suitable runner.

5. The method of utilizing the energy of water under head which comprises, directing a stream of water inwardly from all sides with radial and whirling components with respect to a common axis, changing the radial components to axial direction but preserving the whirling component so as to produce a solid whirling stream advancing along said axis, and passing the whirling stream axially through a runner.

6. The method of utilizing the energy of water under head which consists in directing its flow inwardly from all sides with radial and whirling components with respect to a common axis, changing the radial components to axial direction but preserving the whirling component so as to produce a solid stream whirling about the axis, then advancing said solid stream along the axis, and directing this stream axially against a suitable runner.

7. The method of utilizing the energy of water under head which comprises, directing a stream of water inwardly from all sides with radial and whirling components with respect to a common axis, changing the radial components to axial direction but preserving the whirling component so as to produce a solid whirling stream, then advancing said solid stream along said axis, and passing the whirling stream axially through a runner.

8. The method of utilizing the energy of water under head which consists in directing its flow inwardly from all sides so that the water in a plane normal to a common axis and at all points equidistant from that axis has a radial component and a whirling component of substantially constant value, changing the radial components to axial direction but preserving the whirling component so as to produce a solid stream whirling about and advancing along said axis, and directing this stream axially against a suitable runner.

9. The method of utilizing the energy of water under head which comprises, directing a stream of water inwardly from all sides towards a common axis so that the water in a plane normal to said common axis and at all points equidistant from said axis has a definite angular direction of flow with radial and whirling components, changing the radial components to axial direction but preserving the whirling component so as to produce a solid stream whirling about and advancing along said axis, and directing this stream axially against a suitable runner.

10. The method of utilizing the energy of water under head which consists in directing its flow inwardly from all sides so that the water in a plane normal to a common axis and at all points equidistant from that axis has a radial component and a whirling component of substantially constant value, changing the radial components to axial direction but preserving the whirling component so as to produce a solid stream whirling about said axis, then advancing said solid stream along said axis, and directing this stream axially against a suitable runner.

11. The method of utilizing the energy of water under head which comprises, directing a stream of water inwardly from all sides towards a common axis so that the water in a plane normal to said common axis and at all points equidistant from said axis has a definite angular direction of flow with radial and whirling components, changing the radial components to axial direction but preserving the whirling component so as to produce a solid stream whirling about said axis, then advancing said solid stream along said axis, and directing this stream axially against a suitable runner.

12. The method of utilizing the energy of water under head which consists in directing its flow inwardly from all sides so that the water in a plane normal to a common axis and at all points equidistant from that axis has a radial component and a whirling component of substantially constant value, changing the radial components to axial direction but preserving the whirling component so as to produce a solid stream whirling about and advancing along said axis, directing this stream axially against a suitable runner, and gradually decelerating the flow of water while increasing its pressure.

13. The method of utilizing the energy of water under head which comprises, directing a stream of water inwardly from all sides towards a common axis so that the water in a plane normal to said common axis and at all points equidistant from said axis has a definite angular direction of flow with radial and whirling components, changing the radial components to axial direction but preserving the whirling component so as to produce a solid stream whirling about and advancing along said axis, directing this stream axially against a suitable runner, and gradually decelerating the flow of water while increasing its pressure.

14. In combination, an impeller through which fluid whirls in an axial direction only, means forming a radial flow conduit and a vane-free transition space including an axial flow passage directed toward said impeller, and adjustable means surrounding the axis of said impeller and adapted to produce variable whirling motion of the fluid admitted to said transition space.

15. In combination, an impeller through which fluid whirls in an axial direction only, means forming a radial flow conduit and a vane-free transition space including an axial flow passage directed toward said impeller, and adjustable guide vanes surrounding and extending parallel to the axis of said impeller, said guide vanes crossing said conduit.

16. In combination, an impeller through which fluid whirls in an axial direction only, means forming a radial flow conduit and a vane-free transition space including an axial flow passage directed toward said impeller, adjustable guide vanes crossing said conduit and surrounding the axis of said impeller, and means for adjusting said guide vanes to control the flow of fluid passing said vanes and to varying the degree of whirling of said fluid.

17. In a hydraulic turbine, a runner having vanes of varying angularity throughout their lengths between which fluid whirls in an axial direction only, means forming a radial flow conduit and a vane-free transition space at one end of said runner, and adjustable means surrounding the axis of said runner and adapted to produce variable whirling motion of the fluid admitted to said transition space.

18. In a hydraulic turbine, radial flow adjustable guide vanes, an axial flow runner having vanes of varying angularity throughout their lengths, and a deflector adapted to engage and deflect fluid flowing between said guide vanes and through said runner.

19. In combination, radial flow adjustable guide vanes, a rimless axial flow impeller, an axial flow conduit communicating with said impeller, and a deflector adapted to engage and to deflect fluid flowing between said guide vanes and toward said conduit.

20. In combination, a radial flow conduit portion, an axial flow conduit portion coaxial with said radial flow portion, said conduit portions having a vane-free transition space interposed between them, means for admitting fluid to said transition space and for producing variable whirl of said fluid about said conduit axis, and an impeller in said axial flow conduit portion.

21. In combination, an axial flow impeller having a shaft, inlet means forming a passage for guiding liquid in a direction toward the axis of said impeller, and stationary guiding means for changing to axial the flow between said inlet means and said impeller, said guiding means providing a bearing for said shaft adjacent to said impeller.

22. In a hydraulic turbine, an axial flow impeller, means forming an axial flow conduit communicating with the inlet side of said impeller, means forming a radial flow inlet conduit communicating with said axial flow conduit, whirl producing means associated with said radial flow conduit, and a flow decelerating draft tube communicating with the discharge side of said impeller.

23. In a hydraulic turbine, an axial flow impeller, means forming an axial flow conduit communicating with the inlet side of said impeller, means forming a radial flow conduit communicating with said axial flow conduit, whirl producing means associated with said conduits a substantial distance axially in advance of said impeller, and a flow decelerating draft device communicating with the discharge side of said impeller.

24. In a hydraulic turbine, an impeller through which a vortex of fluid flows in an axial direction only, means forming an axial flow conduit of substantial length communicating with the inlet side of said impeller, means forming a radial flow conduit communicating with the inlet end of said axial flow conduit, means for producing whirling motion of fluid passing through said conduits, and a flow decelerating draft device communicating with the discharge side of said impeller.

25. The method of utilizing the energy of water under head which consists in directing its flow inwardly with radial and whirling components with respect to a common axis, varying the degree of said whirling components, changing the radial components to axial direction but preserving the whirling components so as to produce a solid stream whirling about and advancing along an axis, directing the stream against a runner, and confining said stream by a stationary surface while passing through the runner.

26. In a hydraulic machine, an impeller formed to rotate at relatively high specific speed, means forming an axial flow conduit communicating with the inlet side of said impeller, means forming a radial flow inlet conduit communicating with said axial flow conduit, whirl producing means associated with said radial flow conduit, and a flow decelerating draft tube communicating with the discharge side of said impeller.

27. In a hydraulic machine, an impeller formed to rotate at relatively high specific speed, means forming an axial flow conduit communicating with the inlet side of said impeller, means forming an inward flow conduit communicating with said axial flow conduit, whirl producing means associated with said conduits a substantial distance axially in advance of said impeller, and a flow decelerating draft device communicating with the discharge side of said impeller.

28. In a hydraulic machine, an impeller formed to rotate at relatively high specific speed, means forming an axial flow conduit communicating with the inlet side of said impeller, means for conducting a vortex of whirling liquid laterally of the impeller axis and into said axial flow conduit, and a flow decelerating draft tube communicating with the discharge side of said impeller.

29. In a hydraulic machine, an impeller formed to rotate at relatively high specific speed, means forming an axial flow conduit communicating with the inlet side of said impeller, means for conducting a vortex of whirling liquid laterally of the impeller axis and into said axial flow conduit, whirl producing means associated with said conduits a substantial distance axially in advance of said impeller, and a flow decelerating draft device communicating with the discharge side of said impeller.

In testimony whereof, the signature of the inventor is affixed hereto.

FORREST NAGLER.